United States Patent Office 3,786,034
Patented Jan. 15, 1974

3,786,034
POLYURETHANE POLYMERS FOR USE IN SOFT LENSES AND METHOD OF PRODUCING SOFT LENSES
Edgar Allan Blair, Princeton, and Donald Edward Hudgin, Princeton Junction, N.J., assignors to Frigitronics, Inc., Shelton, Conn.
No Drawing. Filed June 23, 1972, Ser. No. 265,543
Int. Cl. B29d 11/00; G02c 7/04; C08g 22/08
U.S. Cl. 260—77.5 AQ                              9 Claims

ABSTRACT OF THE DISCLOSURE

The use of water absorbtive polyurethane polymers of resins of low equivalent weight and high molecular weight and slightly in excess of equimolar ratios of polyisocyanates or urethane linkage precursors for making soft lenses and for soft contact lenses made from said polymer.

This invention pertains to the use of polyurethane polymers for making soft contact lenses; more particularly, this invention pertains to polyurethane polymers for the purpose of making soft lenses which absorb water, i.e. lenses which are made of polymers which are rigid, machinable and polishable polyurethane polymers; moreover, this invention pertains to articles of manufacture made from said polymer and a method of making articles of manufacture from said polymers such as soft, ophthalmological contact lenses.

BACKGROUND OF INVENTION

Within the last decade, ophthalmological practice has changed by first adopting hard contact lenses and then soft contact lenses. Numerous polymers have been suggested as suitable for use of soft contact lenses, but few have found acceptance. It has now been found that a novel polyurethane polymer is eminently suitable for the purpose of making soft contact lenses, and thus these soft contact lenses made of this polymer constitute new articles of manufacture. Moreover, in order to place the soft lens polymer technology in its proper context, it requires the understanding of polyurethane chemistry.

Within the last few decades polyurethane chemistry has seen a tremendous growth. As a result, polyurethane polymers of various kinds and forms are fairly well known. In general terms the polyurethanes comprise polymers formed from a resin which has an active hydrogen atom and a polyisocyanate, such as a diisocyanate. Numerous resin systems now exist which have been combined in various ratios with the polyisocyanates, and the end polymers have ranged from rigid castable shapes to soft foams. Various polymer and prepolymer reactions for preparing the above types of polyurethanes have also been developed, and these reactions are fairly well explored.

Of the many resin systems which are known and the properties of which have been described, there are continuously being added new resin systems which, in combination with the polyisocyanate, overcome some vexing problems encountered with other resin systems or provide better properties for a particular end use. However, many of these resin systems a priori do not predictably function in a given polymer system; and hence, the empirical observations still are at the foundation for the development of new resin systems as well as discovery of new polymers.

In addition, the various isocyanates which have been available (or proposed to be useful without being available) give different properties in any given resin system as well as give different properties from resin system to resin system. Hence, the predictability of an end polymer properties cannot be inferred from a behavior of the resin system nor the behavior of this resin system in combination of isocyanate, except in very general terms. For this reason the proper combination of the particular resin system with the proper isocyanate and the proper interaction in intercombination with each other is still an empirical art with unpredictable end results. Hence, not only the suggestion that no polyurethane polymer but also the suggestion that no particular polyurethane polymer is useful in soft lens art has been made.

PRIOR ART

In respect to the soft lens polymer art, the closest prior art polymer is the hydrophilic acrylic resin polymers sold under the trademark "Hydron" by National Patent Development Corporation. Other polymers exist in the prior art such as graft polymers, but these are more complicated and do not represent the convenient benchmark in the prior art.

In respect to the polyurethane polymers, numerous publications exist in this art such as J. H. Saunders et al., Polyurethanes, Chemistry and Technology, Part I Chemistry, Interscience Publishers (1962). This book summarizes in part the existing prior art. A great number of subsequent publications including patent literature have also appeared both in the United States and abroad. These publications are too numerous to mention; but in some respect or another, these have some additional illustrations of various polyurethane resins, the isocyanates, the method of employing or making the same. As it is well appreciated by those skilled in the art, these patents are too numerous to list. Inasmuch as there is disclosed in these patents in some way or another something in common because of the common nature of the polyurethane polymer, these patents are illustrative of polyurethane polymers as such.

In respect to the present soft lens invention, the prior art which pertains to the polyurethane polymers is most closely related both to producing soft lenses from different polymers and producing castable shapes from polyurethanes which are strong and desirably nonvariant in properties. However, the prior art, as a desideratum, has striven to form strongly hydrophobic polyurethane polymer systems for the reason that the strongly hydrophobic polymers display low, if any, dimensional variation in the polymer. If hydrophilicity or water absorbtion has been sought for polyurethane polymers, it has most generally been sought for polymers from which foams are formed which are useful as sponges. In general, the hydrophilic polymers have been rather soft.

Of the more prevalent resin systems for producing soft hydrophilic polyurethanes, the polyethylene glycol and polyalkylene amine resin systems are known; the last two resin systems, in distinction from the polypropylene glycol resin systems which are generally hydrophobic, are used for this purpose. Further, the combination of the polyethylene glycol and polypropylene glycol resins have been used to achieve sufficient softness and at the same time sufficient hydrophobicity so that the end product would have the desirable properties. Nevertheless, in soft polymers water pickup has often been considered an undesirable property.

In reference to the isocyanates which have been employed in combination with the above described resins, conventional aromatic isocyanates, when reacted with the various resins, display properties which are unacceptable for a number of reasons.

Although the unacceptable properties can be tolerated in a number of products, in other products the use of aromatic diisocyanates have been found to be acceptable because of the price, availability and well known properties despite the instability and/or degradation of the aromatic diisocyanate in the polyurethane end polymer.

THE INVENTION

A polyurethane polymer soft lens has now been discovered and invented which has the desired properties of softness and water pickup and in the dry state physical properties such as machinability and polishability; besides numerous other beneficial properties and uses, this soft lens is suitable as a replacement for prior art soft lenses. This polyurethane polymer is derived from a unique combination of a proper resin and a proper isocyanate.

In respect to the polyurethane polymer useful for the soft lens, it is obtained by employing a proper —OH group terminated resin. This resin is a product of a propoxylated, ethoxylated, dioxolane reacted and amine or polyamine reacted polyhydroxy compound having a proper molecular weight and proper equivalent weight in combination with the necessary ratio of carbon to oxygen or nitrogen atoms. This resin, when reacted with the isocyanate in a proper amount, produces a rigid, substantially nondegradable polyurethane polymer (in its intended environment) such that the end polymer is useful among other uses for producing the soft lens articles of manufacture within the present day technology.

Moreover, while it is known that prior art polyurethanes which are derived from a so-called "soft" resin can be hardened by using increased amounts of isocyanate, with the concomitant decrease in hydrophilicity, the present soft lens use of the polymer has been achieved by using a proper and low ratio of isocyanate to resin ratio. The observed phenomenon of the increase in hardness and concomitant hydrophobicity of the polymer by increase of isocyanate to resin ratio has been counteracted, in distinction from the prior art, by the proper and novel combination of the molecular weight, equivalent weight, and chemical structure of the resin and isocyanate with the novel end result being a polymer having great increase in water pickup and especially machinability and polishability when used as a preform for making a soft lens. As a consequence, the presently discovered use of the polyurethane polymer has answered the desired need for a soft lens polymer which has the parameters acceptable for manufacturing lenses under the conditions of the present day technology requiring machinable and polishable lenses.

For purposes of the present soft lens use of the polymer, the resin system must be a tractable, i.e. a workable, resin system for a reaction with the isocyanates. A workable resin system is one which is formed of the resin and a solvent or a resin which is a liquid or can be liquified at a reasonable working temperature, e.g. up to 100° C. The preferred solvent is one of following: dimethylformamide, dioxane, butyrolactone.

Of the above-mentioned resins, the propoxylated, ethoxylated or mixed propoxylated and ethoxylated resins are preferred. Further, the dioxolane reacted resin is also very desirable, but its availability mitigates against its use. Although amine and polyamine reacted resins satisfy the requirements for the end polymer, the "in polymer use" properties of these resin systems makes these inferior to the above-mentioned resin components, Amplifying the above, the resin system is derived from a compound which has six or in excess of six —OH groups and which compound is then reacted with the appropriate precursor to obtain, e.g., a propoxylated or ethoxylated or amine group containing resin or a resin having a mixture of these groups such that the ratio of carbon to oxygen or amine atoms is less than 3 to 1, i.e. 2.8 to 1 or preferably 2.5 to 1 and lower. As each of the —OH groups in the compound can react to give the propoxylated, etc., moiety (which has an —OH or amine terminal group in turn), the end product will have the equivalent number of —OH (or amine) end groups for reacting with the isocyanate moiety to form the final polymer.

It is preferable to have a resin precursor compound which has eight or more —OH groups. Of the useful resins those derived from sucrose and raffinose are acceptable. Octahydroxy or more than eight —OH group carrying compounds besides the above are the following: maltose, lactose, cellobiose. These compounds may also be derived by reacting a combination of —OH groups, aldehyde and —COOH group carrying carbohydrates as long as all the reactive groups are reacted with the isocyanate. Additionally, polyvinylalcohol of about 50 monomer units may be employed.

Further, the equivalent weight of the resin must be 170 or less but preferably 140 or less. Simultaneously, the molecular weight should be greater than 500, more desirably greater than 840, preferably 1030 or greater up to 2000 or more. Finally, as mentioned above, the ratio of carbon atoms to oxygen or nitrogen atoms (in the amine or polyamine) in the resin system must be less than 3:1 to 1.5:1, even as low as 1.2:1, i.e. from a value which approximates a propoxylated octahydroxy compound wherein the propoxylated groups consist of repeating units derived from propylene oxide to the same compound which has been reacted with the same number of dioxolane units including the carbon to oxygen ratio content of the basic hydroxy group carrying compound and for the low ratio the partially adducted compounds, i.e. ethoxylated etc., compounds. Moreover, the above molecular and equivalent weight criteria must also be satisfied.

Representative resin systems are as follows: propoxylated sorbitol; ethoxylated sorbitol; propoxylated manitol; ethoxylated manitol; dioxolane reacted sorbitol or manitol; mixed propoxylated-ethoxylated sorbitol or manitol; propoxylated sucrose, raffinose, maltose, lactose or cellobiose; ethoxylated sucrose, raffinose, maltose, lactose, or cellobiose; mixed propoxylated-ethoxylated sucrose, raffinose, maltose, lactose or cellobiose; ethylene imine reaction product of sorbitol, manitol, sucrose, raffinose, maltose, lactose or cellobiose; propylene imine reaction product of sorbitol, manitol, sucrose, raffinose, maltose, lactose, or cellobiose; mixed ethylene imine-propylene imine reaction products of the above polyhydroxy compounds and the dioxolane reaction products of sucrose, raffinose, maltose, lactose or cellobiose; mixed ethylene imine, propylene imine, ethylene oxide and propylene oxide reaction products of the above polyhydroxy compounds are within the contemplation of the present disclosure.

For convenience in representation but not in respect to behavior, the resin may be depicted by a general formula as follows:

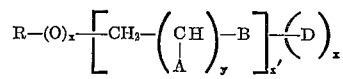

wherein R is a precursor derived from a polyhydroxy compound having 6 or more —OH groups ($x$ is 6 or greater, e.g. up to 50, derived from polyvinyl alcohol of up to 50 monomer units in a chain, including precursors for compounds such as carboxy methyl or ethyl cellulose); $y$ is 1; A is —H or —CH$_3$; B is —CH$_2$—O group, —O or —NH; D is H; and x' is equal to x or smaller because when these compounds are mixtures, x' may be less than x and also different from x by fractions of whole numbers, i.e. these compounds may be internal mixtures in a single molecule as well as mixtures of species; x' may be 0 when a prepolymer formulation is used and may be as low as 1.

In addition, these compounds have an equivalent weight of 170 or less, preferably 140 or less, and a molecular weight of 500 or more, desirably 840 or more, preferably 1030 or more up to 2000. Still further, as mentioned before, the carbon to oxygen or nitrogen ratio must be satisfied.

Most of these resins are specified by their —OH or amine number which is a function of the equivalent weight.

In respect to the isocyanates, these may be represented by OCN—R'—NCO wherein R' is aliphatic including alicyclic compounds such as aliphatic, aliphatic-alicyclic, and aliphatic-aromatic hydrocarbon compounds from 4 to 36 carbon atoms, but conventionally from 6 to 20 and generally from 6 to 13 carbon atoms. Representative examples of the above isocyanates are: tetramethylene diisocyanate; hexamethylene diisocyanate; trimethyl-hexamethylene diisocyanate; dimer acid diisocyanate; isophorone diisocyanate; hydrogenated diphenyl methane diisocyanate; methylene di(cyclohexyl isocyanate); metaxylylene diisocyanate; diethylbenzene diisocyanate.

Other compounds which are useful are the isocyanate equivalents which produce the urethane linkages such as the nitrile carbonates, i.e., the adiponitrile carbonate of the formula

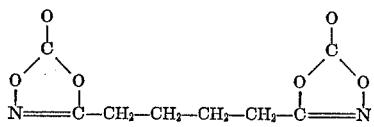

The compound is designated as ADNC and has been found as useful as the preferred isocyanates.

The preferred diisocyanate is the methylene di(cyclohexyl isocyanate) and ADNC. Other but slightly less preferred diisocyanates are trimethyl hexamethylene diisocyanate and isophorone diisocyanate.

Although the aromatic isocyanates such as TDI, MDI, NDI, DADI and TODI, etc. are useful for obtaining the polyurethane polymers and these polymers have the desirable properties, the aromatic isocyanate based polymers are only useful if the degradation or if the stabilizers can be tolerated. Hence, the aromatic isocyanates are vastly less desirable.

A mole to mole ratio of resin and NCO will produce a water soluble and fusible polymer; hence, the ratio of —NCO to resin molecules should be in about a 10%, even up to 15%, excess above the equimolar ratio. If the isocyanate is used in greater excess for the same resin, water pickup of the polymer will decrease. However, some resins (low equivalent weight) will tolerate considerable increase of the isocyanate above the equimolar ratio. Additionally, a prepolymer may be reacted with the resin in addition to the isocyanate such as a polyethylene oxide and isocyanate prepolymer. The ethylene oxide may be up to 100 units in the prepolymer; a prepolymer of 4 ethylene oxide units is a convenient lower range for the prepolymer, although the lowest unit may be ethylene glycol as a derivative of ethylene oxide. The polyol may be as low as 10% by weight when a prepolymer is used and as high as 40% by weight based on the total weight of polyol and prepolymer.

In reacting the resin with the isocyanate, either a one-shot or a prepolymer reaction procedure may be followed. The reaction is carried out by heating the reactants for the appropriate length of time; the reaction may also be accelerated or controlled by appropriate catalysts such as stannous octoate, dibutyl tin salts, DABCO, or other tertiary amines or compounds recognized as catalysts for urethane reactions and well known in the art. The polymer may be prepared in bulk, in solution or in suspension.

In furnishing an illustrative embodiment of the present invention, the following examples not only illustrate but also amplify the above described invention; however, the examples herein are for the purpose of illustrating the invention which invention is to be viewed from all the present disclosure and not merely from the examples.

EXAMPLE I

A prepolymer was prepared by reacting 10 g. of a polyethylene oxide with a molecular weight of 400 with 13.1 g. Hylene W, using 0.01 g. stannous octoate as the catalyst. This prepolymer was reacted with 4 g. Atlac 2566, giving a tough polymer which swelled in water, could be machined cleanly, but could not be polished. Atlac 2566 is reportedly a propoxylated sorbitol with a hydroxyl number of 650.

EXAMPLE II 10.3 g. of Voranol RS–45 D, from Dow Chemical, a propoxylated sucrose having a molecular weight of 1030 was reacted with 2.3 g. of Hylene W, by heating for 72 hours at 95° C. The polymer melted when cut with a saw, and could not be polished. It swelled and softened in water and absorbed about 30% $H_2O$. Hylene W is an aliphatic isocyanate with an equivalent weight of 131 and is reportedly hydrogenated HMDI. Atlac 2566 as well as Voranol RS–45 D has been used for rigid foams when reacted in an equivalent to equivalent ratio with isocyanates producing a highly cross-linked, highly hydrophobic polymer.

EXAMPLE III 10.3 g. of Voranol RS–45 D was reacted with 3.0 g. Hylene W as in Example II. The product was hard and did not melt when cut with a saw. It could be machined and polished. It swelled in water and softened, and absorbed 26% water. A contact lens was made with this polymer, and it had the desirable properties of a soft contact lens.

EXAMPLE IV 10.3 g. Voranol RS–45 D was reacted with 2.3 g. IPDI (isophorone diisocyanate), a diisocyanate with an equivalent weight of 111 derived from isophorone obtained from Veba Chemie, giving a hard polymer which tended to melt when cut with a saw. It swelled and softened in water, absorbing about 50% $H_2O$. Increasing the amount of isocyanate will harden the polymer but also reduce the water pickup, i.e. adding a trifunctional isocyanate compound will make the resin more thermoset; similarly, adding more isocyanate, the same characteristic is obtained; an acceptable polymer of 37% water pickup can thus be obtained.

EXAMPLE V 10.3 g. Voranol RS–45 D was reacted with 1.5 g. ADNC (adiponitrile carbonate) from Arco Chemical having an equivalent weight of 130 by heating at 95° C. until evolution of $CO_2$ ceased. Then 1.5 g. Hylene W was added and the mixture heated to complete the reaction. The resulting product was softer in the dry state than the product from Example III but absorbed the same amount of water.

In illustrating the above polymer system useful for soft lenses, i.e. ophthalmologically useful, the previously mentioned Hydron (trademark of National Patent Development Corporation, New York, N.Y.), a hydrophilic acrylic resin base polymer, is a convenient benchmark. The properties of the present polymer favorably compare, in the use of same for soft lens purposes, with the Hydron soft lens polymers. These properties will now be further amplified. In general the polymer useful for soft lenses may have a water pickup in excess of 20%; generally a water pickup of 37% or more by weight is rather easily achieved. The polymer may be cast by techniques well known in the art in preforms from which lens blanks are cut and machined.

Subsequently, the lens blanks are polished. The lenses made from the described polymer possess the necessary light stability because of the polymer structure and are free from extractable components. These lenses are based on the use of the described polymers which possess the necessary burst strength, employed in the soft lens art with the necessary water transmission. Although for the latter test measurements are made, quantitative requirement values have not been established.

Transparency, because of the thin section, is also not required to be equivalent to optical glass transparency and is easily met when using the described polymer. Moreover, uniformity of refractive index is good when using the described polymer (no change in power of lens from batch to batch of polymer). Similarly, uniformity of water absorption in the soft lenses is also good. Other indicia of acceptable soft lenses are polymer stability, which is good when using the described polymer.

What is claimed is:

1. In a process for producing a soft lens, the improvement comprising:

(A) reacting to produce a polyurethane polymer from a resin precursor of said polyurethane polymer a polyfunctional resin having an equivalent weight of 170 and less, a molecular weight of at least 840, and a ratio of carbon to oxygen or nitrogen atoms of less than 3 to 1 wherein the polyfunctional resin is a propoxylated, ethoxylated, dioxolane reacted, mixture of propoxylated, ethoxylated and dioxolane reacted, ethylene imine or propylene imine reacted derivatives of an hydroxy group containing compounds having the general formula

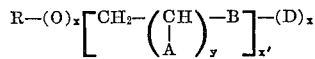

wherein R is a precursor derived from a polyhydroxy compound having 6 or more —OH groups; $y$ is 1; A is —H or —CH$_3$; B is —CH$_2$—O group or —O or —NH; D is H; and $x'$ is equal to $x$ or less than $x$; when mixtures, $x'$ may be less than $x$ and different from $x$ by whole numbers or fractions of whole numbers and mixtures of said resins of the depicted formula, and reacting as a urethane linkage precursor of said polymer an aliphatic, alicyclic or aliphatic-alicyclic polyfunctional isocyanate or a nitrile carbonate of a functionality of 2 and higher in an amount from 0.02% equivalent weight to about 15% excess above the equimolar ratio in reference to the equimolar amount of said resin;

(B) casting said polyurethane polymer in a lens preform shape;

(C) machining an individual lens blank from said cast preform shape;

(D) polishing said lens blank to obtain said soft lens wherein said lens has a water pickup of at least 20% by weight.

2. The process as defined in claim 1 and wherein in addition, as additional urethane linkage precursor of said polymer, a prepolymer of polyethylene oxide and said isocyanate is reacted with said resin.

3. The process as defined in claim 1 and wherein said lens has a water pickup of 37% by weight.

4. As an article of manufacture, a soft contact lens having a water pickup of at least 37% by weight, uniformity of water absorption, having a light stability of at least one year, optical transparency sufficient for a soft lens, uniform refractive index, and consisting essentially of a polyurethane polymer prepared by reacting as a resin precursor thereof, a polyfunctional resin having an equivalent weight of 140 and less, a molecular weight of at least 840, and a ratio of carbon to oxygen or nitrogen atoms of less than 3 to 1 wherein the polyfunctional resin is a propoxylated, ethoxylated, dioxolane reacted, mixture of propoxylated, ethoxylated and dioxolane reacted, ethylene imine or propylene imine reacted, derivatives of an hydroxy group containing compounds having the general formula

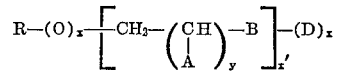

wherein R is a precursor derived from a polyhydroxy compound having 6 or more —OH groups; $y$ is 1; A is —H or —CH$_3$; B is —CH$_2$—O group or —O or —NH; D is H; and $x'$ is equal to $x$ or less than $x$; when mixtures, $x'$ may be less than $x$ and different from $x$ by whole numbers or fractions of whole numbers and mixtures of said resins of the depicted formula, and reacting as a urethane linkage precursor of said polymer an aliphatic, alicyclic or aliphatic-alicyclic polyfunctional isocyanate or a nitrile carbonate of a functionality of 2 and higher in an amount from 0.02% equivalent weight to about 15% excess above the equimolar ratio in reference to the equimolar amount of said resin.

5. The soft contact lens as defined in claim 4 and wherein the same is of a polyurethane polymer of a reaction product of (a) as an isocyanate, in a 10% stoichiometric excess, methylene di(cyclohexyl isocyanate) and (b) as a resin, a propoxylated octahydroxy carbohydrate of an equivalent weight of 140 and a molecular weight of 1030.

6. The soft contact lens as defined in claim 4 and wherein the same is of a polyurethane polymer of a reaction product of adiponitrile carbonate and a propoxylated sucrose of an equivalent weight of less than 1030.

7. As an article of manufacture, a soft contact lens having a water pickup of at least 37% by weight, uniformity of water absorption, having a light stability of at least one year, optical transparency sufficient for a soft lens, uniform refractive index, and consisting essentially of a polyurethane polymer prepared by reacting as a resin precursor thereof, a polyfunctional resin having an equivalent weight of 170 and less, a molecular weight of at least 500 and a ratio of carbon to oxygen or nitrogen atoms of less than 3 to 1 wherein the polyfunctional resin is a propoxylated, ethoxylated, dioxolane reacted, mixture of propoxylated, ethoxylated and dioxolane reacted, ethylene imine or propylene imine reacted, derivatives of an hydroxy group containing compounds having the general formula

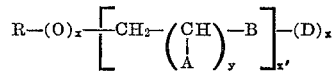

wherein R is a precursor derived from a polyhydroxy compound having 6 or more —OH groups; $y$ is 1; A is —H or —CH$_3$; B is —CH$_2$—O group or —O or —NH; D is H; and $x'$ is equal to $x$ or less than $x$; when mixtures, $x'$ may be less than $x$ and different from $x$ by whole numbers or fractions of whole numbers and mixtures of said resins of the depicted formula, and reacting as a urethane linkage precursor of said polymer an aliphatic, alicyclic or aliphatic-alicyclic polyfunctional isocyanate or a nitrile carbonate of a functionality of 2 and higher in an amount from 0.02% equivalent weight to about 15% excess above the equimolar ratio in reference to the equimolar amount of said resin.

8. The soft contact lens as defined in claim 7 and wherein the same is of a polyurethane polymer of a reaction product of (a) as an isocyanate, in a 10% stoichiometric excess, methylene di(cyclohexyl isocyanate) and (b) as a resin, a propoxylated octahydroxy carbohydrate of an equivalent weight of 140 and a molecular weight of 1030.

9. The soft contact lens as defined in claim 7 and wherein the same is of a polyurethane polymer of a reaction product of adiponitrile carbonate and a propoxylated sucrose of an equivalent weight of less than 1030.

References Cited

UNITED STATES PATENTS

| | | | |
|---|---|---|---|
| 3,699,089 | 10/1972 | Witchterle | 264—1 X |
| 3,647,736 | 3/1972 | Ewell | 264—1 X |
| 3,639,524 | 2/1972 | Seiderman | 264— 1 UX |

ROBERT F. WHITE, Primary Examiner

A. M. SOKAL, Assistant Examiner

U.S. Cl. X.R.

260—2 EN, 77.5 AS, 77.5 SS, 858; 264—1; 351—160, 177